United States Patent [19]
Lewis

[11] Patent Number: 6,127,827
[45] Date of Patent: Oct. 3, 2000

[54] METHOD OF IDENTIFYING A BURIED CABLE BY APPLYING A LOW FREQUENCY SIGNAL TO THE CABLE AND DETECTING THE RESULTANT FIELD

[75] Inventor: Andrew Biggerstaff Lewis, Bristol, United Kingdom

[73] Assignee: Radiodetection Limited, Bristol, United Kingdom

[21] Appl. No.: 08/776,013

[22] PCT Filed: Jul. 21, 1995

[86] PCT No.: PCT/GB95/01723

§ 371 Date: Jan. 16, 1997

§ 102(e) Date: Jan. 16, 1997

[87] PCT Pub. No.: WO96/03664

PCT Pub. Date: Feb. 8, 1996

[30] Foreign Application Priority Data

Jul. 22, 1994 [GB] United Kingdom .................... 9414847

[51] Int. Cl.[7] ................................ G01V 3/06; G01V 3/08; G01V 3/10; G01R 19/00
[52] U.S. Cl. ................................................ 324/326; 324/67
[58] Field of Search ................................. 324/326, 66, 67, 324/133, 234, 227, 528, 529, 530, 539

[56] References Cited

U.S. PATENT DOCUMENTS

| | | | |
|---|---|---|---|
| 3,076,931 | 2/1963 | Jasper | 324/67 |
| 3,924,179 | 12/1975 | Dozier | 324/67 |
| 3,991,363 | 11/1976 | Lathrop | 324/67 |
| 5,644,237 | 7/1997 | Eslamkoolchi | 324/67 |

*Primary Examiner*—Walter E. Snow
*Attorney, Agent, or Firm*—Woodbridge & Associates, P.C.; Richard C. Woodbridge

[57] ABSTRACT

In order to identify a cable buried underground, a very low frequency voltage signal is applied to the cable and an electric field sensor is brought into proximity with the cable. The sensor thus detects the voltage signal on the cable and so identifies the cable. The sensor is unaffected by one or more additional cables carrying voltage signals, which are proximate the cable of interest, as the electric filters from such additional cables do not pass to the cable of interest. The sensor is mounted on a probe which is mounted into a bore in the soil around the cable of interest. The probes may also carry a magnetometer for detecting magnetic fields generated by low frequency alternating current signals on the cable of interest.

12 Claims, 2 Drawing Sheets

METHOD OF IDENTIFYING A BURIED CABLE BY APPLYING A LOW FREQUENCY SIGNAL TO THE CABLE AND DETECTING THE RESULTANT FIELD

BACKGROUND OF THE INVENTION

1. Field of the Invention

The present invention relates to the identification of a cable buried underground.

2. Summary of the Prior Art

The proliferation of networks of buried cables for many different utilities (electricity, telecommunications, etc) has made it increasingly difficult to identify whether any particular cable, located by a suitable location technique, belongs to a particular utility or not.

Existing identification arrangements fall into two types. Firstly, optical identification techniques involve excavation of the ground in the vicinity of a buried cable, until the cable is visible, and thus can be identified. In order for such an excavation to be carried out, the cable must first be located (i.e. its position determined to enable excavation to take place at the right location), and the excavation thus needed is time-consuming. Furthermore, excavation involves a risk of damage or interference to the buried cable, or possibly to other cables in the immediate vicinity. Moreover, visual identification of cables is not certain. Cables belonging to different utilities can be physically identical, so that visual location systems involve the need for some pre-knowledge of the cables in the vicinity of the excavation site.

It is also possible to identify buried cables by applying an audio frequency electrical signal to the cable, and then detecting the magnetic fields generated by that signal at the surface. This removes the need for excavation, since the frequencies of the signal are chosen so that the magnetic fields generated will be detectable at surface level.

However, such an audio frequency signal may be transferred to other cables by induction and capacitive leakage. This leads to distorted magnetic fields, resulting in mis-location of the cable, or even the possibility of the wrong cable being identified, because induction results in the signal being carried by a cable other than that to which it is applied.

Many different proposals have been made for improving such electromagnetic location, but none have wholly prevented the problem of mis-identification.

U.S. Pat. No. 5,194,812 discloses a method of identifying a cable buried underground in which an alternating current signal is applied to the cable and the magnetic field due to the current signal is detected using a magnetic field sensor brought into proximity with the cable. In U.S. Pat. No. 5,194,812 the alternating signal has a frequency of 10 Hz to 500 KHz.

SUMMARY OF THE INVENTION

In accordance with a first aspect of the present invention, a very low frequency voltage signal is applied to the cable, when the cable is isolated. That voltage can then be detected by a suitable electric field sensor brought into proximity with the cable.

The present invention seeks to avoid the possibility of inductive or capacitive transfer of the signal applied to the cable to other adjacent cables. In principle, the best frequency for achieving this is zero (i.e. DC) since then the inductive/capacitive leakage from the cable would be zero. However, if a zero frequency signal is used, the signal cannot be distinguished from stray ground currents. Therefore, a very low frequency signal is applied, to give the signal an identification which can be distinguish from the stray ground currents, and thus permit filtering, but is as close as possible to zero to minimise inductive/capacitive leakage.

The frequencies of voltage that are used are thus below the audio frequency range. They will be below 10 Hz, preferably not greater than 1 Hz. Because the ground is normally conductive, there is little or no ground penetration of the field. As a result, the sensor must be brought immediately adjacent, or into contact with, the cable and this will thus involve excavation to enable the cable to be identified. However, unlike visual inspection methods, there is no possibility of misidentification.

At a very low frequency close to zero, the signal level is substantially constant along the length of the cable. This is to be contrasted with the use of audio frequency signals, where the level of the signal decays along the length of the cable. Hence, even if there were stray currents which appeared at the same frequency as the low frequency signal on the cable, the probability of them being at the same level as the signal applied to the cable is sufficiently low to be ignorable.

In theory, it would be possible to detect the field by excavating to the cable, and for the sensor then to be located within the excavated hole, but spaced from the cable, since air provides a non-conductive space between the cable and the sensor enabling the electric field to be detected. In practice, however, water, soil, or any other material between the cable and the sensor would prevent satisfactory detection being made.

As a result of this, although the probability of incorrect identification is extremely low, there is a possibility that the cable will not be identified at all. Therefore, a second aspect of the present invention proposes that a very low frequency current signal be applied to this cable, with the magnetic field generated by that current signal being detected by a suitable detector. Unlike known systems for detecting magnetic fields, the frequency of the signal is low.

Again, frequencies less than 10 Hz, preferably less than 1 Hz are used. As before, this aspect of the invention could operate at zero frequency (DC) but again there would then be the problem of distinguishing the signal from stray ground currents. Hence, a frequency as close as possible to zero is used.

As a result of the use of such a very low frequency, there is no coupling of the signal on the cable to adjacent cables and the range of detection is short. However, the detection is affected by stray current on adjacent lines, since this may generate magnetic fields, and thus there is a greater possibility of mis-identification than in the first aspect. On the other hand, since the electromagnetic field can be detected regardless of the presence of soil or water between the detector and the cable, the possibility of failure to identify the cable, if the sensor is close to the cable, is eliminated.

Hence, it is preferable that the first and second aspects are used in combination. First, the low frequency current is applied to the cable and a probe containing both an electric field sensor and a magnetic field sensor is brought close to the cable. At a suitable range, e.g. 15 cm, the magnetic field sensor will detect the magnetic field from the cable and thus provide a reliable indication that there is a cable present. There is, at that time, a possibility that the cable sensed by the magnetic field sensor is not the correct one.

Then, the sensor is brought into contact with the cable, and the cable isolated, and the low frequency voltage signal applied. The electric field sensor will then enable the cable unambiguously to be identified.

BRIEF DESCRIPTION OF THE DRAWINGS

An embodiment of the present invention will now be described in detail, by way of example, with reference to the accompanying drawings, in which.

DETAILED DESCRIPTION

Figure 1:
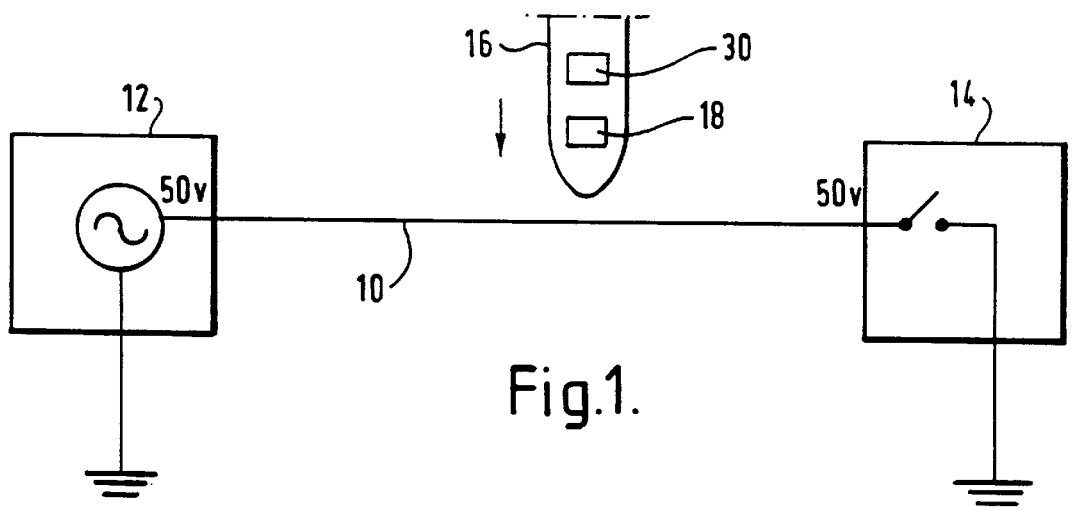
FIG. 1 is a schematic diagram explaining the basic principles of cable identification according to embodiments of the present invention.

Turning first to FIG. 1, a cable 10, which is buried underground, is to be identified. Since there may be many other cables in the vicinity of cable 10 at a particular site, it is necessary not only to determine the position of the cable 10 (i.e. to "locate" the cable), but also to identify that the cable is that belonging to a particular utility (to "identify" it).

According to a first embodiment of the present invention, a signal generator 12 is contacted to the cable 10, as is a switch 14. Suppose now that the switch 14 is in the opened state, as shown in FIG. 1, and a low frequency signal is applied to the cable 10 by the generator 12. That low frequency is less than 10 Hz, preferably not greater than 1 Hz. Then, the cable 10 will have voltage thereon, and by suitably modulating the signal applied thereto, a unique voltage signal may be created.

In order to detect that voltage signal, a probe 16 having an electric field sensor 18 therein is brought into the immediate proximity of the cable 10. Once the sensor 10 is sufficiently close to the cable 10, and assuming that the gap therebetween is non-conductive, the sensor will be able to detect the electric field on the cable 10, so that it is possible unambiguously to identify the cable 10 as being that connected to the generator 12.

In principle, the sensor is capable of detecting a signal which is a DC signal, i.e. has a low frequency of zero. The frequency of the signal does not affect the electric field on the cable 10. However, as previously mentioned, such a DC signal is not easily distinguished from a stray ground current, and the use of a low frequency signal, as close as possible to zero, enables the signal to be distinguished from such currents.

Since the voltage on the cable is determined entirely by the generator 12, different "stray" voltages on other cables adjacent the cable 10 will not effect the reliability of identification, since they are unlikely to be modulated, and have the same frequency, as the voltage generated by the generator 12. Moreover, the electric field from the cable 10 does not penetrate the soil around the cable 10 because of the conduciveness of the soil. Thus, there is no possibility of the fields from adjacent cables being detected by the sensor 18. Hence, any identification of the cable 10 is unambiguous.

Figure 2:
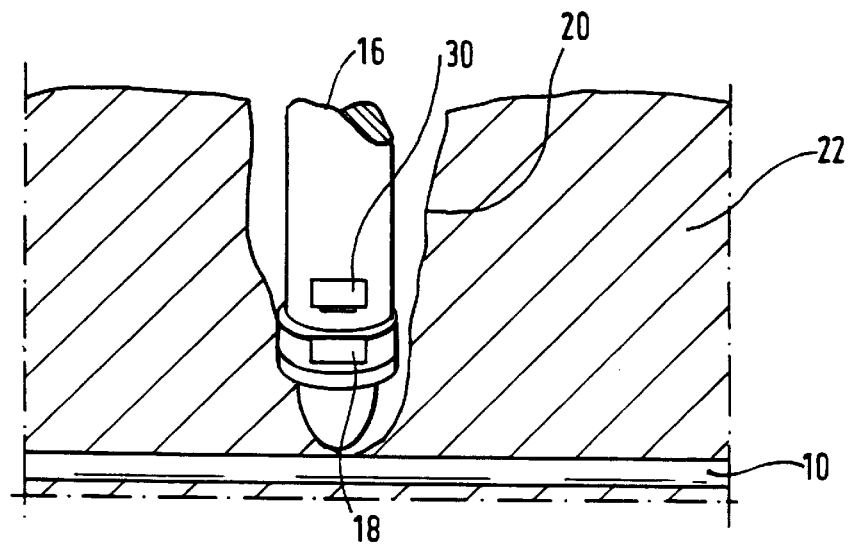
FIG. 2 shows in more detail the probe of FIG. 1.
Figure 3:
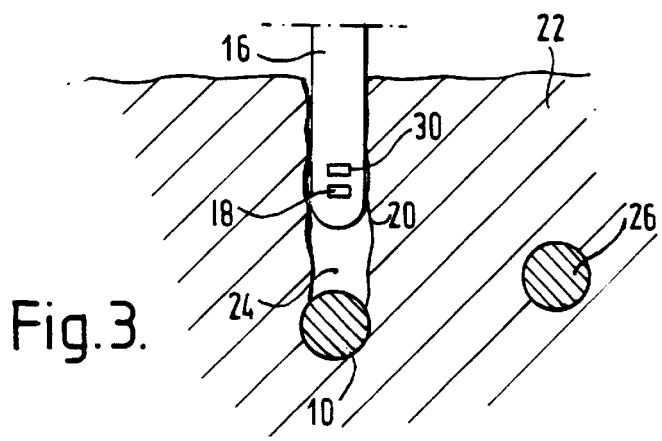
FIG. 3 is a schematic view showing the relationship of probe and cables in the embodiment of FIG. 1.
Figure 4:
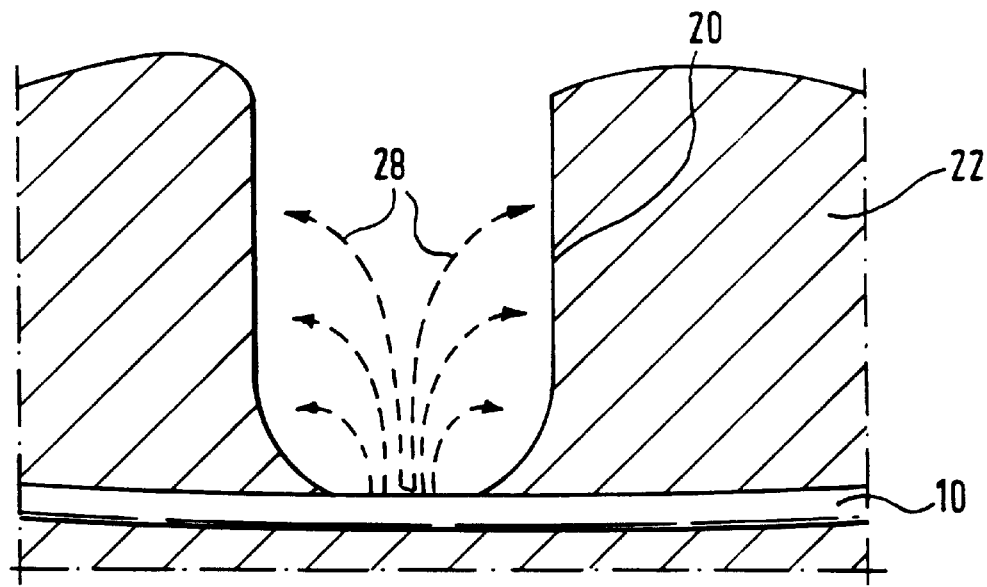
FIG. 4 shows the electric field from the cable when the cable is exposed.
Figure 5:
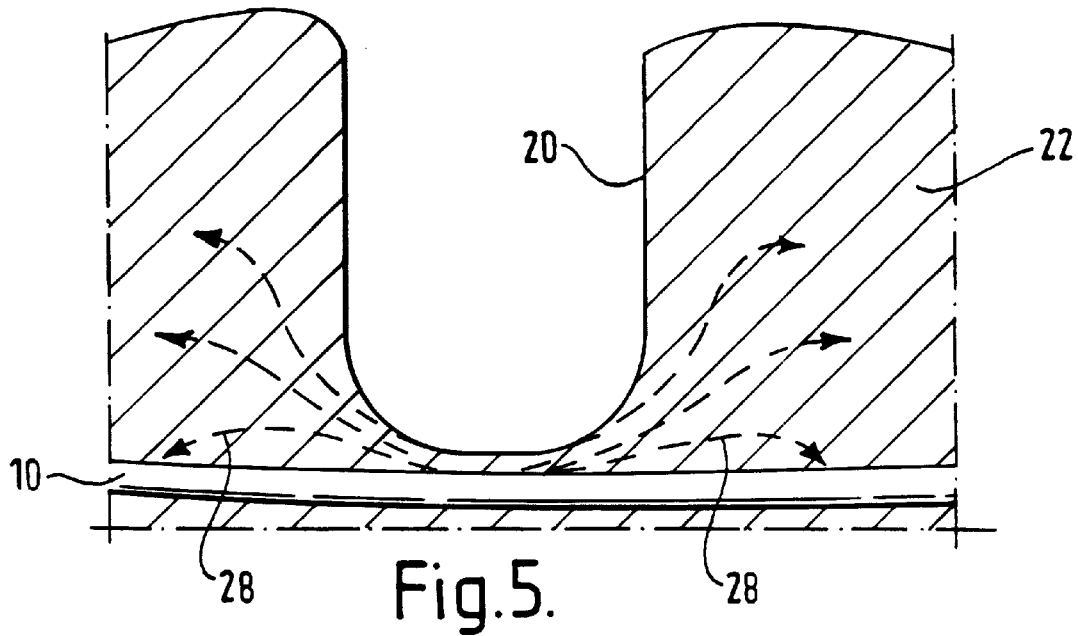
FIG. 5 shows the electric field from the cable when the cable is not exposed.

This effect is illustrated in more detail in FIGS. 2 and 3. If a bore 20 is excavated in the soil 22 around the cable 10, then the probe 16 can be inserted in that bore 20, and the sensor 18 will detect the electric field from the cable 10 when the tip of the probe 16 is sufficiently close to the cable 10. This assumes that the space 24 (see FIG. 3) within the bore 20 between the cable 10 and the tip of the probe 16 is empty, since air is a poor conductor. If that space 24 fills with water, however, or with soil, then the cable 10 cannot be identified. This effect is illustrated in more detail by FIGS. 4 and 5. FIG. 4 illustrates the electric field 28 in the bore 20 if the cable 10 is exposed in the bore 20. As the probe 16 is brought into the bore 20, the electric field 28 can be detected by the sensor 18. If, however, the bore 20 does not penetrate the soil 22 sufficiently to reach the cable 10, so there is a small amount of soil covering the cable 10 as shown in FIG. 5, then the electric field 28 does not extend into the bore 22, but is constrained to be in the soil 22 only. As a result, if the probe 18 is brought into the bore 20 in these circumstances the cable 16 cannot be identified.

On the other hand, even if there is an adjacent cable 26 carrying a similar voltage signal, as shown on FIG. 3, the sensor 18 will not detect it because the soil 22 prevents the electric field from the cable 26 reaching the sensor 18.

Hence, there is virtually no possibility of a cable being identified as being connected to the generator 12, when it is not so connected. There is, however, the possibility of there being no identification at all, because of unsatisfactory coupling of the electric field from the cable 10 to the sensor 18.

Therefore, in the second embodiment of the present invention, the switch 14 is closed, permitting a current to flow along the cable 10. Since the same, or similar, generator 12 can be used, the frequencies of that current are again low, being less than 10 Hz. Again, frequencies not greater than 1 Hz are preferred, with the aim of getting as close as possible to zero, but permitting the current to be distinguished from stray DC ground currents.

Because of that low frequency, there will be little or no induction of the signal on the cable 10 to adjacent cables. However, the penetration of the magnetic field around the cable 10 will be small. As a result, if the probe 16 carries a magnetometer 30, the electromagnetic field around the cable 10 will be detected only when the magnetometer 30 of the probe 16 is sufficiently close to the cable 10. Distances of the order of 15 cm are preferred.

The electromagnetic field from the cable 10 can be detected by the magnetometer 30 independent of the material between the cable 10 and the magnetometer 30. Thus, in the arrangement of FIG. 2, the cable 10 can be identified by the magnetometer 30 even if there is soil or water in the space 24. On the other hand, the magnetometer 30 will detect any magnetic field of sufficient strength. Thus, if the cable 26 in FIG. 2 also carries a corresponding signal, this will also be detected by the magnetometer 30. There is thus very little chance of total failure of identification, but there is the possibility of mis-identification.

In fact, the possibility of mis-identification is low because of the low frequency of the current signal. Since the frequency of that current signal is low, any inductive or capacitive coupling of the signal to adjacent cables is minimal. As a result, there is a substantially constant current along the length of the cable 10, and any stray fields from other cables are likely to be of lower amplitude, and hence less likely to be detected.

Hence, it is preferable that these two arrangements are used in combination. First, the probe 16 is inserted into the bore 20 with the switch 14 closed, and the magnetometer 30 used to provide an initial identification of the coil. Then, the switch 14 is opened and the sensor 18 used to give further positive identification.

Because the frequencies of the current and voltage signals applied to the cable 10 by the generator 12 are low, a relatively long sampling period (e.g. of the order of 10s) is needed.

This invention is particularly, but not exclusively, useful in combination with the locator disclosed in our UK patent application number 9409003.2. In that application, a locator for locating an underground cable had a ground penetration probe containing locator antennas which detected electromagnetic signals from a conductor such as a cable, and enabled the position of the ground penetration probe relative to the conductor to be determined. The probe could therefore be driven into the ground towards the cable 10, and the operator provided with information that enabled the probe to brought into close proximity to the cable without the risk of the probe damaging the cable 10 due to forceful impact.

Using such a device, and with the sensor 18 and magnetometer 30 mounted on the ground penetration probe, it is possible to bring the probe into contact with the cable to enable measurements to be made.

What is claimed is:

1. A method of identifying a cable buried underground comprising the steps of:
    (a) electrically isolating the cable;
    (b) applying a voltage signal to the cable, the voltage signal having non-zero frequency less than 10 Hz;
    (c) bringing an electric field sensor into proximity with the cable; and
    (d) detecting the electric field due to the voltage signal using said sensor.

2. A method according to claim 1 wherein said step of bringing the sensor into proximity with the cable includes forming a bore from the surface of the ground to the cable and inserting the sensor into the bore.

3. A method according to claim 1 wherein the sensor is brought into contact with the cable.

4. A method according to claim 1 wherein said voltage signal has a modulation applied thereto.

5. A method according to claim 1 further including the steps of:
    (e) applying a current signal to the cable, the current signal having a non-zero frequency less than 1OHz;
    (f) bringing a magnetic field sensor into proximity with the cable; and
    (g) detecting the magnetic field due to the current signal using the sensor.

6. A method according to claim 5 wherein said current signal has a modulation applied thereto.

7. A method of locating or identifying a cable buried underground comprising the steps of:
    a. applying a current signal to the cable, the current signal and all of its components having a non-zero frequency less than 10 Hz;
    b. bringing a magnetic field sensor into proximity with the cable; and
    c. detecting the magnetic field created by the current signal using the sensor.

8. A method according to claim 7 wherein the step of bringing the sensor into proximity with the cable includes forming a bore from the surface of the ground to the cable and inserting the sensor into the bore.

9. A method according to claim 7 wherein said current signal has a modulation applied thereto.

10. A method of identifying a cable buried underground comprising the steps of:
    (a) applying a current signal, to the cable, the current signal having all of its components at a non-zero frequency that are less than 10 Hz;
    (b) bringing a magnetic field sensor in the proximity with the cable without circumventing the cable; and
    (c) detecting the magnetic field created by the current signal using the sensor.

11. A method according to claim 10 wherein the step of bringing the sensor into proximity with the cable includes forming a bore from the surface of the ground to the cable and inserting the sensor into the bore.

12. A method according to claim 10 wherein said current signal has a modulation applied thereto.

* * * * *